US012647852B2

(12) United States Patent
Park

(10) Patent No.: US 12,647,852 B2
(45) Date of Patent: Jun. 2, 2026

(54) METHOD AND APPARATUS FOR PROVIDING ACCESS POLICY IN WIRELESS COMMUNICATION SYSTEM

(71) Applicant: SAMSUNG ELECTRONICS CO., LTD., Suwon-si (KR)

(72) Inventor: Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 18/056,646

(22) Filed: Nov. 17, 2022

(65) Prior Publication Data

US 2023/0164649 A1 May 25, 2023

(30) Foreign Application Priority Data

Nov. 19, 2021 (KR) ........................ 10-2021-0160347

(51) Int. Cl.
*H04W 36/00* (2009.01)

(52) U.S. Cl.
CPC .............................. *H04W 36/0072* (2013.01)

(58) Field of Classification Search
CPC ......... H04W 36/0072; H04W 36/0066; H04W 36/0055; H04W 36/14; H04W 36/0033; H04W 36/0022; H04W 36/00835; H04W 88/08; H04W 36/00224; H04W 36/00725; H04W 36/008357; H04W 36/144
See application file for complete search history.

(56) References Cited

U.S. PATENT DOCUMENTS

| | | | | |
|---|---|---|---|---|
| 11,166,153 | B1 * | 11/2021 | Carames ................. | H04W 4/70 |
| 2020/0275323 | A1 * | 8/2020 | Wu ......................... | H04W 8/24 |
| 2020/0351720 | A1 * | 11/2020 | Chin ................. | H04W 36/0007 |
| 2021/0227438 | A1 * | 7/2021 | Xu .......................... | H04W 8/18 |

(Continued)

FOREIGN PATENT DOCUMENTS

| | | | | | |
|---|---|---|---|---|---|
| CN | 113330817 | A | * | 8/2021 | ............ H04W 48/18 |
| WO | WO-2009024094 | A1 | * | 2/2009 | ........ H04W 36/0011 |
| WO | WO-2019243872 | A1 | * | 12/2019 | ............ H04W 72/02 |

OTHER PUBLICATIONS

3GPP TSG WG2 Meeting #139E, KI #12, New Sol: NWDAF—assisted RFSP Policy (Year: 2020).*

(Continued)

*Primary Examiner* — Ankur Jain

(57) ABSTRACT

The disclosure relates to a method and apparatus for providing an AM policy for a UE in a wireless communication system. The disclosure is applicable to apply a consistent policy to a UE in a system in which 4G and 5G networks co-exist. According to the disclosure, a BS in a wireless communication system may include a transceiver, and at least one controller coupled to the transceiver. The at least one controller may be configured to determine handover for a UE based on a communication state of the UE, transmit a handover request message for the UE to an AMF, receive a handover command for the UE from the AMF in response to transmitting the handover request message, and perform a handover procedure with the UE. The handover request message may include information related to a rule used to select a network and a frequency applied to the UE.

8 Claims, 7 Drawing Sheets

(56)        References Cited

U.S. PATENT DOCUMENTS

2021/0274472 A1    9/2021  Foti et al.
2023/0026417 A1 *  1/2023  Thantharate ...... H04W 36/0016

OTHER PUBLICATIONS

3GPP TSG SA WG2 Meeting #139E, "KI #12, New Sol: NWDAF—assisted RFSP Policy" (Year: 2020).*
International Search Report and Written Opinion of the International Searching Authority dated Feb. 14, 2023, in connection with International Application No. PCT/KR2022/017766, 7 pages.
Apple, "KI #12, New Sol: NWDAF—assisted RFSP Policy," S2-2003825, 3GPP TSG SA WG2 Meeting #139E, 7 pages.
Vivo et al., "Open Discussion about eNA work in R18," S2-2106313, 3GPP TSG SA WG2 Meeting #146E (e-meeting), 12 pages.
Supplementary European Search Report dated Jan. 27, 2025, in connection with European Patent Application No. 22895974.8, 9 pages.
Huawei, "Subscriber Type Transfer over S1 and X2," R3-081142, 3GPP TSG RAN WG3 Meeting #60, Kansas City, USA, May 5-9, 2008, 3 pages.
China Telecom, "New SID on enhancement of 5G AM Policy," S2-2108437 (Revision of S2-2108155-was2107225r03-was6799-was5587r06), SA WG2 Meeting #S2-148E, E-Meeting Nov. 15-19, 2021, 4 pages.

* cited by examiner

METHOD AND APPARATUS FOR PROVIDING ACCESS POLICY IN WIRELESS COMMUNICATION SYSTEM

CROSS-REFERENCE TO RELATED APPLICATION

This application is based on and claims priority under 35 U.S.C. § 119 to Korean Patent Application No. 10-2021-0160347, filed on Nov. 19, 2021, in the Korean Intellectual Property Office, the disclosure of which is incorporated by reference herein in its entirety.

BACKGROUND

1. Field

The disclosure relates to a method and apparatus for providing an access and mobility (AM) policy in a wireless communication system.

2. Description of Related Art

In order to meet the demand for wireless data traffic soaring since the $4^{th}$ generation (4G) communication system came to the market, there are ongoing efforts to develop enhanced $5^{th}$ generation (5G) communication systems or pre-5G communication systems. For the reasons, the 5G communication system or pre-5G communication system is called the beyond 4G network communication system or post LTE system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, such as beamforming, massive multi-input multi-output (MIMO), full dimensional MIMO (FD-MMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

To enable a network to control access of a user equipment (UE) to the network using 4th generation (4G) and 5th generation (5G) wireless communication systems, an access policy is required. Without a consistent access policy applicable to the UE in the 4G and 5G wireless communication systems, the communication performance and experienced performance of the UE may be significantly reduced, and a service may be interrupted.

Provided are a method and apparatus for, when a UE moves between 4G and 5G systems, providing an access policy for the UE in a wireless communication system enabling interworking between 4G and 5G networks.

Additional aspects will be set forth in part in the description which follows and, in part, will be apparent from the description, or may be learned by practice of the presented embodiments of the disclosure.

According to an embodiment of the disclosure, a base station (BS) in a wireless communication system may include a transceiver and at least one controller coupled to the transceiver. The at least one controller may be configured to determine handover for a UE based on a communication state of the UE, transmit a handover request message for the UE to an access and management function (AMF), receive a handover command for the UE from the AMF in response to the transmission of the handover request message, and perform a handover procedure with the UE. The handover request message may include information related to a rule used to select a network and a frequency applied to the UE.

According to another embodiment of the disclosure, a BS in a wireless communication system may include a transceiver and at least one controller coupled to the transceiver. The at least one controller may be configured to receive a handover request message for a UE from a mobility management entity (MME), transmit a handover response message for the handover request message to the MME, and perform a handover procedure with the UE. The handover request message may include information related to a rule used to select a network and a frequency applied to the UE.

According to another embodiment of the disclosure, a method performed by a BS in a wireless communication system may include determining handover for a UE based on a communication state of the UE, transmitting a handover request message for the UE to an AMF, receiving a handover command for the UE from the AMF in response to the transmission of the handover request message, and performing a handover procedure with the UE. The handover request message may include information related to a rule used to select a network and a frequency applied to the UE.

According to another embodiment of the disclosure, a method performed by a BS in a wireless communication system may include receiving a handover request message for a UE from an MME, transmitting a handover response message for the handover request message to the MME, and performing a handover procedure with the UE. The handover request message may include information related to a rule used to select a network and a frequency applied to the UE.

According to various embodiments of the disclosure, a stable service may be provided to a UE by providing a consistent access and mobility (AM) policy for movement of the UE between 4G and 5G networks in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
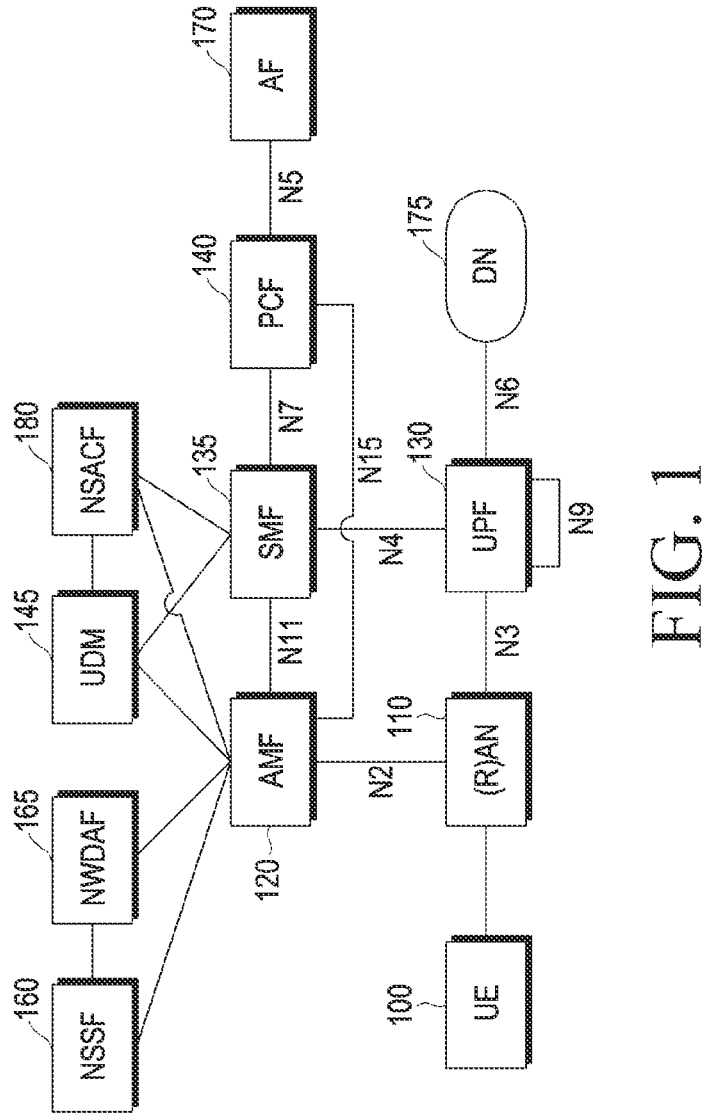
FIG. 1 illustrates a system structure of a 5th generation system (5GS) according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure are described below in detail with reference to the accompanying drawings. A detailed description of a generally known function or structure of the disclosure will be avoided lest it should obscure the subject matter of the disclosure. Although the terms as described later are defined in consideration of functions in the disclosure, the terms may be changed according to the intention of a user or an operator, or customs. Therefore, the definitions should be made, not simply by the actual terms used but by the meanings of each term lying within.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification.

The disclosure relates to a method and apparatus for supporting various services in a wireless communication system. Specifically, the disclosure describes a technique of providing a stable service by managing and applying a policy for a system and a frequency band to be used for communication of a user equipment (UE) using 4th generation (4G) and 5th generation (5G) networks in a wireless communication system.

Terminology identifying an access node, terminology signifying network entities or network functions (NFs), a terminology signifying messages, terminology signifying interfaces between network entities, and terminology signifying various types of identification information as used in the following description are given for convenience of description. Accordingly, the disclosure is not limited to the terms described below, and the terms may be replaced by other equivalent terms in technical meanings.

For convenience of description, the disclosure uses terms and names defined in the 3rd generation partnership project long term evolution (3GPP LTE) and 5G standards. However, the disclosure may be equally applied to systems conforming to other standards, not limited by the above terms and names.

For convenience of description, the names of NFs (e.g., access and mobility management function (AMF), session management function (SMF), network slicing selection function (NSSF), and so on) are used to indicate entities for exchanging information for access control and state management. However, embodiments of the disclosure are equally applicable even when NFs are actually implemented as instances (AMF instance, SMF instance, NSSF instance, and so on).

FIG. 1 illustrates a system structure of a 5G system (5GS) according to various embodiments of the present disclosure. The 5GS may include a 5G core network, a radio access network (RAN), and a UE. The 5G core network may include an AMF 120, an SMF 135, a user plane function (UPF) 130, a policy control function (PCF) 140, a user data management (UDM) 145, an NSSF 160, a network data analytics function (NWDAF) 165, a non-3GPP function (N3F) and so on.

A UE 100 may access the 5G core network through a RAN BS (hereinafter, a RAN) 110. The RAN 110 may support a 3GPP access network type (e.g., new radio (NR), evolved UMTS terrestrial radio access (E-UTRA), and so on) or a non-3GPP access network type (e.g., wireless fidelity (Wi-Fi)). The UE 100 may be connected to the AMF 120 via an N2 interface and to the UPF 130 via an N3 interface, through the RAN 110. The RAN 110 may also be referred to as "access point (AP)," "eNodeB or eNB," "5G node," "gNodeB or gNB," or other terms having equivalent technical meanings, as well as base station (BS). The N3F is an NF that operates as an N2 interface and N3 interface termination for the UE 100 that has accessed through a non-3GPP access network (e.g., Wi-Fi or the like) not defined by the 3GPP. The N3F may process N2 control-plane signaling and N3 user-plane packets.

The AMF 120 is an NF that manages wireless network access and mobility for a UE. The SMF 135 is an NF that manages a session for a UE, and session information includes quality of service (QoS) information, charging information, and packet processing information. The UPF 130 is an NF that processes user-plane traffic, and is controlled by the SMF 135. The PCF 140 is an NF that manages an operator policy for providing a service in the wireless communication system. The UDM 145 is an NF that stores and manages UE subscription information. A UDR is an NF that stores and manages data. The UDR may store UE subscription information and provide the subscription information to the UDM.

In addition, the UDR may store operator policy information and provide the operator policy information to the PCF. The NWDAF 165 is an NF that provides analysis information to operate the 5G system. The NWDAF may collect data from another NF or an operations, administration, and maintenance (OAM) included in the 5GS, analyze the collected data, and provide analysis results to another NF. A network slice admission control function (NSACF) 180 is an NF that monitors and controls the number of registered UEs and the number of sessions of a network slice subject to network slice admission control (NSAC). The NSACF stores configuration information about a maximum number of registered UEs and a maximum number of sessions for each network slice.

For convenience of description, entities for exchanging information for access control and state management will be generically described as NFs (or a core network). However, embodiments of the disclosure are equally applicable even when NFs are actually implemented as instances (e.g., AMF instance, SMF instance, NSSF instance, and so on, respectively).

In the present disclosure, an instance may refer to a state in which a specific NF exists in the form of software code, and is executable by physical and/or logical resource allocation for executing a function of the NF from a physical computing system, for example, a specific computing system existing on a core network. Therefore, an AMF instance, an SMF instance, and an NSSF instance may mean that physical and/or logical resources are allocated and usable for AMF, SMF, and NSSF operations from a specific computing system existing on the core network, respectively. As a result, physical AMF, SW, and NSSF devices may perform the same operations as AMF, SMF, and NSSF instances using physical and/or logical resources allocated for AMF, SMF, and NSSF operations by a specific computing system existing on the network. Therefore, in an embodiment of the disclosure, the term NF (AMF, SMF, UPF, NSSF, NRF, SCP, and so on) may be replaced with NF instance, or vice versa. Likewise, the term network slice may be replaced with network slice instance, or vice versa in an embodiment of the disclosure.

According to an embodiment of the disclosure, in the 5G system defined by the 3GPP, one network slice may be referred to as single-network slice selection assistance information (S-NSSAI). The S-NSSAI may include a slice/service type (SST) and a slice differentiator (SD). The SST may indicate the features (e.g., enhanced mobile broadband (eMBB), Internet of things (IoT), ultra-reliable low-latency communication (URLLC), vehicle to everything (V2X), or the like) of a service supported by the slice. The SD may be a value used as an additional identifier (ID) for the specific service indicated by the SST.

An NSSAI may include one or more S-NSSAIs. Examples of the NSSAI may include, but not limited to, a configured NSSAI stored in a UE, a requested NSSAI requested by a UE, an allowed NSSAI that is allowed to be used by a UE, as determined by an NF (e.g., the AMF 120, the NSSF 160, or the like) of the 5G core network, and a subscribed NSSAI to which a UE has subscribed.

The UE 100 may be simultaneously connected to the RAN 110 and registered in the 5G system. Specifically, the UE 100 may access the RAN 110 and perform a UE registration procedure with the AMF 120. During the registration procedure, the AMF 120 may determine an allowed slice (allowed NSSAI) available to the UE 100 that has accessed the RAN 110, and allocate the allowed NSSAI to the UE 100. The UE may select a specific slice establish a protocol data unit (PDU) session for communication with an actual application server. One PDU session may include one or more QoS flows, and each QoS flow may provide a different transmission performance required for each application service by configuring a different QoS parameter. While the UE is performing the registration procedure, the PCF may establish an access and mobility (AM) policy to be applied to the UE based on subscription information stored in the UDR and transmit the AM policy to the AMF. The AM policy may include a network/radio access technology (RAT) to be used by the UE and a RAT/frequency selection priority (RFSP) rule that prioritizes frequency bands.

Figure 2:
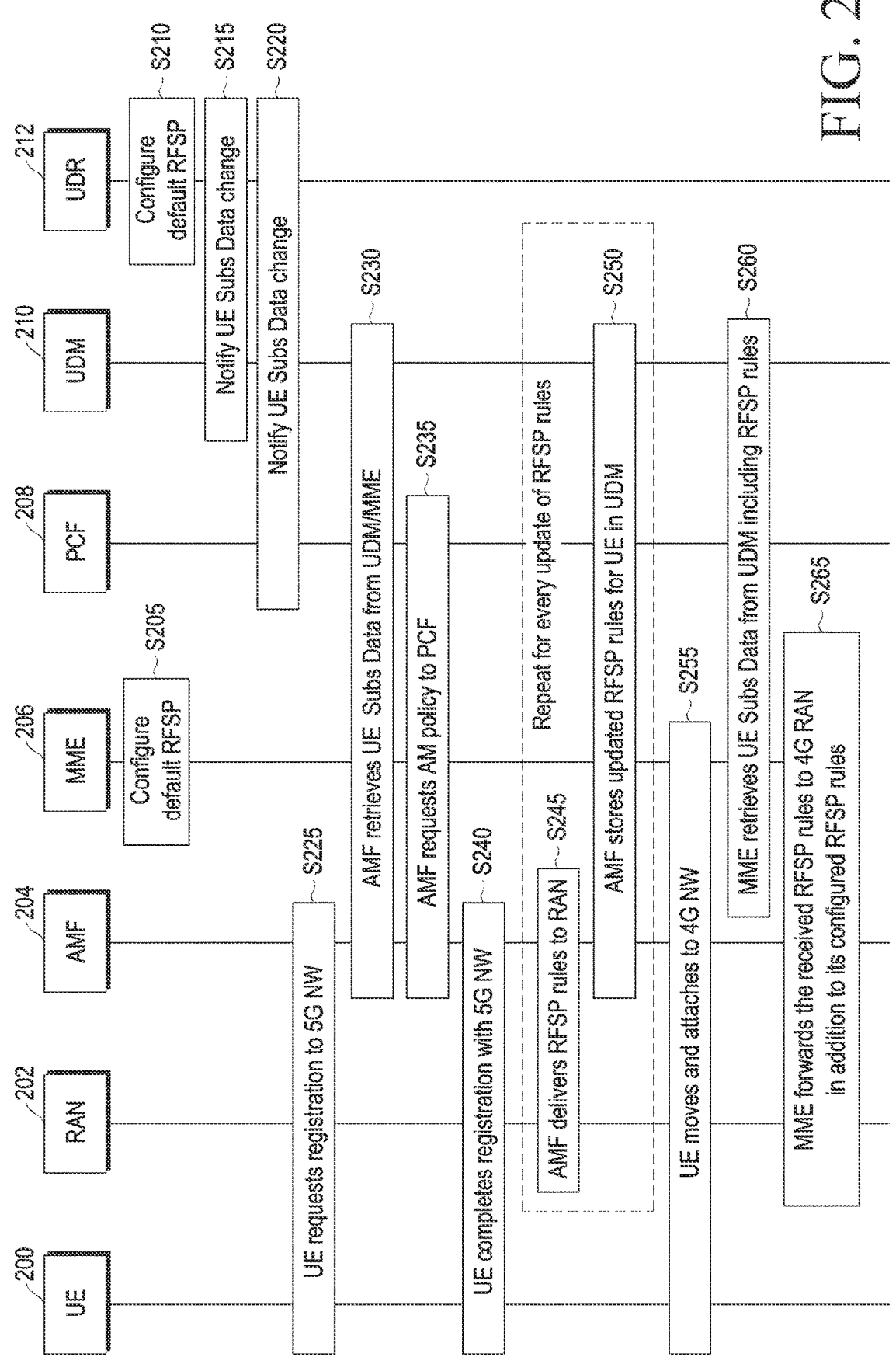
FIG. 2 illustrates a signal flow for a procedure of providing an access and mobility (AM) policy to a user equipment (UE) when the UE switches from a 5G network to a 4G network according to various embodiments of the present disclosure.

FIG. 2 illustrates a signal flow for a procedure of providing an AM policy to a UE when the UE switches from a 5G network to a 4G network according to various embodiments of the present disclosure. Referring to FIG. 2, as a PCF according to an embodiment of the disclosure provides an AMF with an AM policy to be applied to a UE, and the AMF transmits an RFSP rule to a RAN and a UDM, a network and a frequency band to be used from between 4G and 5G networks for communication by the UE may be controlled consistently.

A mobility management entity (MME) 206 of the 4G network and a UDR 212 of the 5G network may store a 4G default RFSP rule and a 5G default RFSP rule to be applied to each UE as part of UE subscription information (subscription data), respectively by an operator or the like (S205 and S210). The default RFSP rules may be predetermined by the operator and stored.

The UDR 212 may notify a UDM 210 that the UE subscription information has changed, and transmit the changed UE subscription information to the UDM 210 (S215).

The UDR 212 may notify a PCF 208 that the UE subscription information has changed, and transmit the changed UE subscription information to the PCF 208 (S220).

A UE 200 may transmit a registration request message to an AMF 204 to use a communication service (S225). For example, the UE 200 may transmit the registration request message to the AMF 204 through a RAN 202 to establish a connection with the 5G network.

The AMF 204 may request the UDM 210 to provide the UE subscription information about the UE 200 in order to process the registration request of the UE 200. When the UE 200 connected to the 4G network has moved to the 5G network, the AMF 204 may request RFSP information used for communication in the 4G network by the UE 200 from the MME 206 by transmitting a handover message or a context transfer request message, apart from requesting the UE subscription information from the UDM 210 (S230). The UE subscription information received from the UDM 210 by the AMF 204 may include information about the 5G default RFSP rule set in the UDR 212 by the operator in operation S210. The RFSP rule may include information specifying RATs and/or frequency bands to be used by the UE 200, and may be provided in the form of a list sequentially arranged according to priorities.

For example, the RFSP rule may designate a 20-MHz frequency band in a 2.5 GHz band in which 4G LTE is used as a highest priority, and a 100-MHz frequency band in a 3.5 GHz band in which 5G NR is used as a second-highest priority, for communication of the UE 200. In another embodiment, in the case of a network system without the PCF 208, the AMF 204 may apply the received default RFSP rule as part of an AM policy for the UE.

The AMF 204 may request an AM policy to be applied to the UE 200 from the PCF 208 (S235). The PCF 208 may establish an AM policy including an RFSP rule to be applied to the UE 200 in consideration of information about the default RFSP rule received from the UDM 210, an operator policy, a network congestion state, and so on, and transmit the established AM policy to the AMF 204.

The AMF 204 may complete a series of procedures for registration of the UE 200 (S240).

Operations S245 and S250 may be performed in parallel with operation S240 or simultaneously in the process of performing operation S240, and various combinations may be possible depending on implementation. The AMF 204 may transmit the RFSP rule included in the AM policy received from the PCF 208 in operation S235 to the RAN 202 (S245). According to implementation and an operator policy, the AMF 204 may additionally change the RFSP rule received from the PCF 208 by applying a congestion state for each frequency, a user class, and so on before transmitting the information to the RAN 202. The RAN 202 may determine a frequency band to be used by the UE 200 for communication by applying priorities included in the received RFSP rule, and allocate radio resources to the UE 200. The RAN 202 may transmit, to the UE 200, information about the priorities of networks/RATs available to the UE 200 for selection, so that the UE 200 may select the 4G or 5G network with priority by applying the specified priorities of the networks/RATS in a network/RAT selection or reselection process. For example, the RAN 202 may transmit the information about the priorities of the networks/RATs to the UE 200 by broadcasting system information. Further, the RAN 202 may transmit the RFSP rule to the UE 200.

The AMF 204 may transmit the same information as the RFSP rule transmitted to the RAN 202 to the UDM 210 (S245), and the UDM 210 may store the RFSP rule in case the UE 200 moves to the 4G network in the future (S250). Operations S245 and S250 may be repeatedly performed whenever information about the RFSP rule is changed or updated during communication of the UE 200 in the 5G network.

The UE 200 may move to the 4G network out of 5G coverage or move to the 4G network to use a specific application such as a voice service, and perform an access procedure with the MIME 206 (S255).

The MME 206 may request and receive the UE subscription information about the UE 200 from the UDM 210 in the process of processing an access request of the UE 200. The UE subscription information may include information about the RFSP rule applied to the UE 200 in the 5G network, stored by the UDM 210 in operation S250 (S260).

The MME 206 may transmit, to the RAN 202, information about the default RFSP rule to be applied in the 4G network set by the operator in operation S205 and information about the RFSP rule used in the 5G network received from the UDM 210 in operation S260 (S265).

In another embodiment, the MME 206 may transmit the information about the RFSP rule used in the 5G network received from the UDM 210 to the RAN 202 as it is without interpreting the information about the RFSP rule, or may combine the 4G default RFSP rule and the received 5G RFSP rule into a new RFSP rule and transmit the new RFSP rule to the RAN 202. When the RAN 202 receives both the 4G default RFSP rule and the 5G RFSP rule, the RAN 202 may apply the 5G RFSP rule with priority over the 4G default RFSP rule in order to control the network/RAT and frequency band use of the UE 200. This process may enable application of a consistent AM policy, when the UE 200 switches networks in the wireless communication system including the 4G network and the 5G network.

Figure 3:
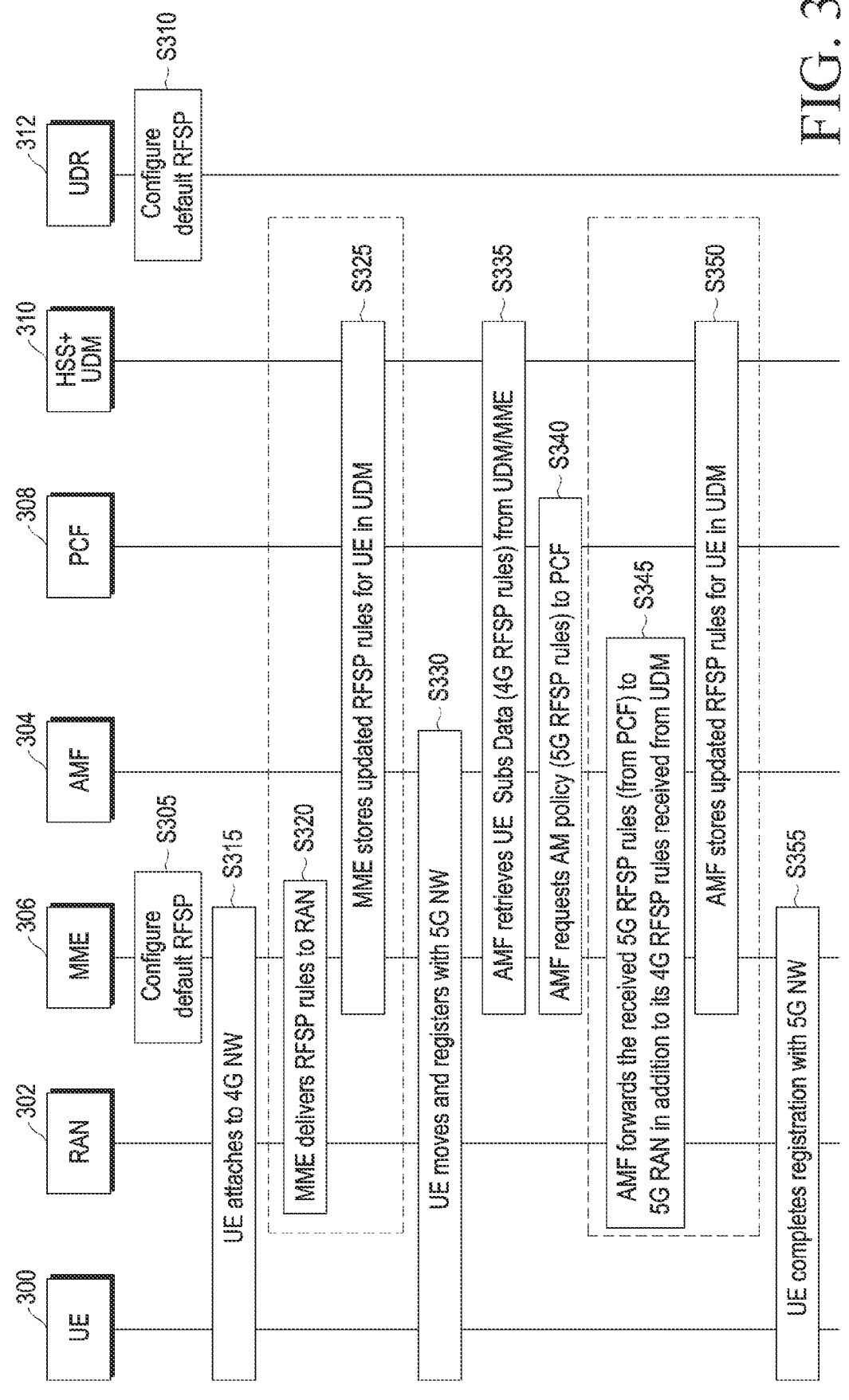
FIG. 3 illustrates a signal flow for a procedure of providing an AM policy to a UE when the UE switches from a 4G network to a 5G network according to various embodiments of the present disclosure.

FIG. 3 illustrates a signal flow for a procedure of providing an AM policy to a UE when the UE switches from a 4G network to a 5G network according to various embodiments of the present disclosure.

According to an embodiment, an MME 306 of the 4G network and a UDR 312 of the 5G network may store a 4G default RFSP rule and a 5G default RFSP rule to be applied to each UE 300 as part of UE subscription information (subscription data), respectively by an operator or the like (S305 and S310).

The 300 may perform an access procedure with the MME 306 in order to use a 4G communication service (S315). For example, the UE 300 may transmit an attach message to the MMF 306 through a RAN 302.

The MME 306 may transmit information about the RFSP rule stored in operation S305 to the RAN 302 (S320).

The MME 306 may transmit the same information about the RFSP rule as transmitted to the RAN 302 in operation S320 to a home subscriber server (HSS)+UDM 310, and the HSS+UDM 310 may store the received information about the RFSP rule in case the UE 300 may move to the 5G network in the future (S325).

The UE 300 may perform a registration procedure with an AMF 304 in order to use a 5G communication service (S330). For example, the UE 300 may transmit a registration message to the AMF 304 through the RAN 302 to establish a connection with the 5G network (S330).

The AMF 304 may request the HSS+UDM 310 to provide UE subscription information about the UE 300 in order to process the registration request of the UE 300 (S335). When the UE 300 connected to the 4G network has moved to the 5G network, the AMF 304 may request RFSP information used for communication in the 4G network by the UE 300 from the MME 306 by transmitting a handover message or a context transfer request message, apart from requesting the UE subscription information from the HSS+UDM 310. While not shown, the UDR 312 may preliminarily notify the HSS+UDM 310 that the UE subscription information has changed and transmit the changed UE subscription information to the HSS+UDM 310.

Further, the UDR 312 may preliminarily notify a PCF 308 that the UE subscription information has changed and transmit the changed UE subscription information to the PCF 308. The UE subscription information that the AMF 304 has received from the HSS+UDM 310 may include information about the 5G default RFSP rule set in the UDR 312 by the operator in operation S310 and/or information about the 4G default RFSP rule stored in the HSS+UDM 310 by the MMS 306 in operation S325, The RFSP rule may include information specifying RATs and/or frequency bands to be used by the UE 300, and may be provided in the form of a list sequentially arranged according to priorities.

For example, the RFSP rule may designate a 20-MHz frequency band in the 2.5 GHz band in which 4G LTE is used as a highest priority, and a 100-MHz frequency band in the 3.5 GHz band in which 5G NR is used as a second-highest priority, for communication of the UE 200. In another embodiment, in the case of a network system without the PCF 308, the AMF 304 may apply the received default RFSP rule as part of an AM policy for the UE.

The AMF 304 may request an AM policy to be applied to the UE 300 from the PCF 308 (S340). The PCF 308 may establish an AM policy including an RFSP rule to be applied to the UE 300 in consideration of the information about the RFSP rule received from the UDR 312 (or the HSS+UDM 310), an operator policy, a network congestion state, and so on, and transmit the established AM policy to the AMF 304.

The AMF 304 may transmit the RFSP rule included in the AM policy received from the PCF 208 in operation S340 to the RAN 302. Further, the AMF 304 may transmit the 4G default RFSP rule stored in the UDM to the RAN 302 (S345). Depending on implementation and an operator policy, the AMF 304 may additionally change the RFSP rule received from the PCF 308 by applying a congestion state for each frequency, a user class, and so on before transmitting the information to the RAN 302. The AMF 304 may transmit the information about the RFSP rule used in the 5G network received from the HSS+UDM 310 to the RAN 302 as it is without interpreting the information about the RFSP rule, or may combine the 4G default RFSP rule and the received 5G RFSP rule into a new RFSP rule and transmit the new RFSP rule to the RAN 302.

The RAN 202 may determine a frequency band to be used by the UE 300 for communication by applying priorities included in the received RFSP rule, and allocate radio resources to the UE 300. The RAN 302 may transmit, to the UE 300, information about the priorities of networks/RATs available to the UE 300 for selection, so that the UE 300 may select the 4G or 5G network with priority by applying the specified priorities of the networks/RATs in a network/RAT selection or reselection process.

For example, the RAN 302 may transmit the information about the priorities of the networks/RATs to the UE 300 by broadcasting system information. Further, the RAN 302 may transmit the RFSP rule to the UE 300. When the RAN 302 has received both the 4G default RFSP rule and the 5G RFSP rule, the RAN 302 may apply the 5G RFSP rule with priority over the 4G default RFSP rule in order to control the network/RAT and frequency band use of the UE 300.

The AMF 304 may transmit the same information as the RFSP rule transmitted to the RAN 302 to the HSS+UDM 310, and the HSS+UDM 310 may store the RFSP rule in case the UE 300 may move to the 4G network again in the future (S350). Operations S345 and S350 may be repeatedly performed whenever information about the RFSP rule is changed or updated during communication of the UE 300 in the 5G network.

The AMF 304 may complete a series of procedures for registration of the UE 300 (S355). This process may enable application of a consistent AM policy, when the UE 300 switches networks in the wireless communication system including the 4G network and the 5G network.

Figure 4:
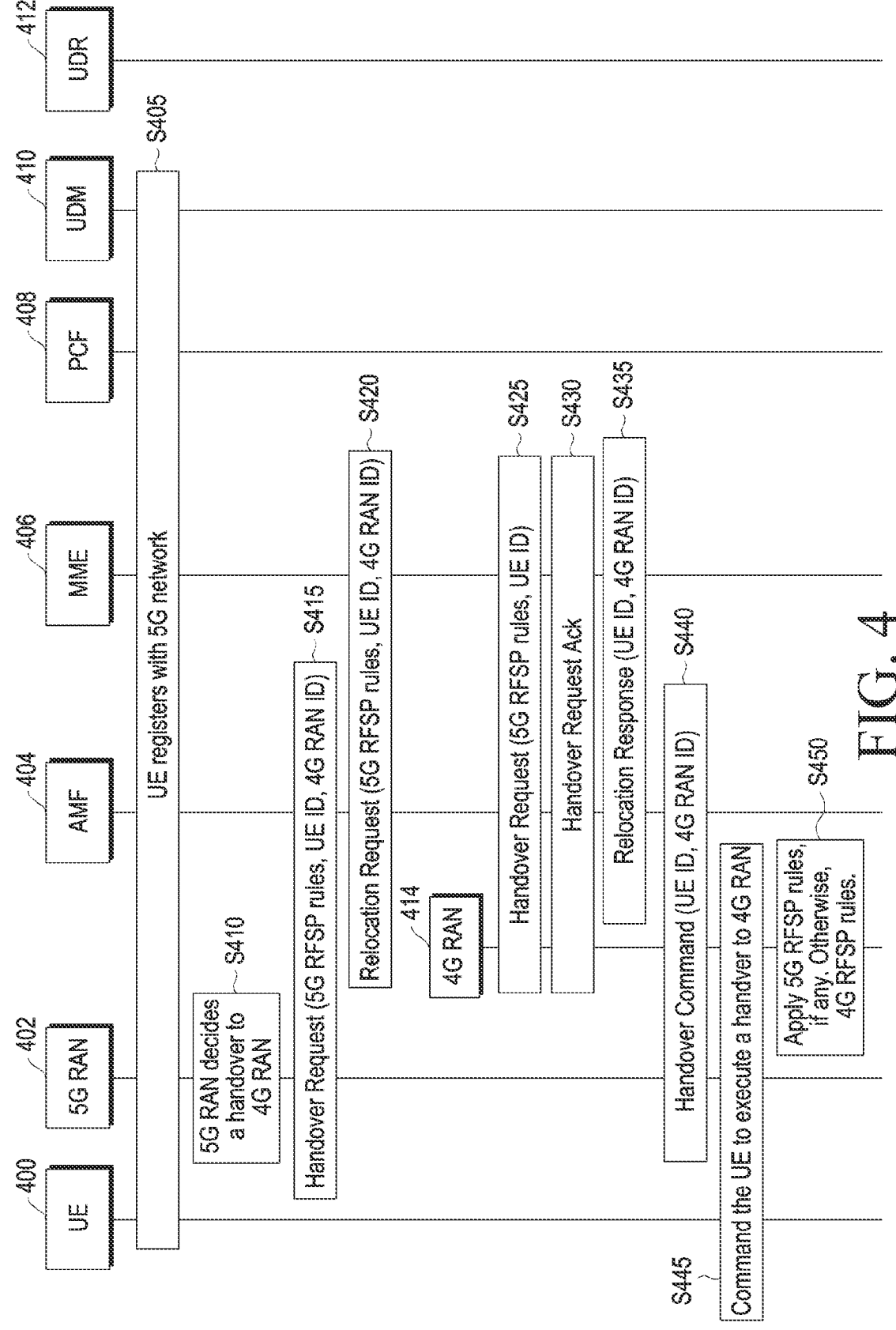
FIG. 4 illustrates a signal flow for a handover procedure for providing an AM policy to a UE when the UE switches from a 5G network to a 4G network according to various embodiments of the present disclosure.

FIG. 4 illustrates a signal flow for a handover procedure for providing an AM policy to a UE when the UE switches from a 5G network to a 4G network according to various embodiments of the present disclosure.

Referring to FIG. 4, a PCF 408 according to an embodiment of the disclosure may provide an AMF 404 with an AM policy to be applied to a UE, and the AMF 404 may transmit an RFSP rule to a RAN 402 so that the RFSP rule is used. Further, the AMF 404 may transmit the RFSP rule to a RAN of a new network to which the UE has moved by a handover signal message, thereby controlling the UE to consistently use a network and a frequency band for communication during movement to the 5G network or the 4G network.

A UE 400 may perform a registration procedure with the 5G network (S405). The registration procedure may include the processes of operations S210 to S245 described above in the embodiment of FIG. 2, which are equally applied in this embodiment, and thus are not described redundantly in detail.

A 5G RAN 402 may determine handover to the 4G network in consideration of the radio quality of the UE 400 (S410).

The 5G RAN 402 may transmit a handover request message requesting handover to a 4G RAN 414 to the AMF 404 (S415). The handover request message may include at least one of information related to a 5G RFSP rule applied to the UE 400 by the 5G RAN 402, UE identification information (a UE identifier (ID)), and 4G RAN identification information (a 4G RAN ID).

The AMF 404 may transmit a relocation request message to the MME 406 of the 4G network to forward the handover request received from the 5G RAN 402 (S420). The relocation request message may include at least one of the information related to the 5G RFSP rule, the UE identification information, or the 4G RAN identification information included in the handover request message by the 5G RAN 402 in operation S415. According to another embodiment, the AMF 404 may directly include the information related to the 5G RFSP rule in the relocation request message without receiving the information related to the 5G RFSP rule from the 5G RAN 402 in operation S420, rather than the 5G RAN 402 includes the information related to the 5G RFSP rule in the handover request message in operation S415.

The MME 406 may transmit handover request information received from the AMF 404 to the 4G RAN 414 through another handover request message (S425). The other handover request message may include the information related to the 5G RFSP rule transmitted by the 5G RAN 402 in operation S415 (or the information related to the 5G RFSP rule included by the AMF 404 in operation S420). In addition, the other handover request message may include information related to a 4G default RFSP rule to be applied to the 4G network, preconfigured for the MME 406 by the operator. According to another embodiment, the MME 406 may determine a new RFSP rule by combining the RFSP rule used in the 5G network received from the AMF 404 and the 4G default RFSP rule, and transmit the new RFSP rule.

The 4G RAN 414 may transmit a handover request acknowledgment (Ack) message to the MME 406 in response to the handover request (S430).

The MME 406 may transmit a relocation response message to the AMF 404 to notify the AMF 404 that the handover request has been accepted (S435).

Upon receipt of the relocation response message, the AMF 404 may transmit, to the 5G RAN 402, a handover command message instructing the handover of the UE 40 requested by the 5G RAN 402 to be performed (S440).

The UE 400 may switch to the 4G network according to a command from the 5G RAN 402 and access the 4G RAN 414 to perform a handover procedure (S445).

When the 4G RAN 414 has received both the information related to the 4G default RFSP rule and the information related to the 5G RFSP rule in the handover process, the 4G RAN may apply the 5G MP rule with priority to control the network/RAT and frequency band use of the UE 400 (S450). For example, when the 4G RAN 414 has received both the 4G RFSP rule and the 5G RFSP rule, the 4G RAN 414 may assign a higher application priority to the 5G RFSP rule. This process may enable application of a consistent AM policy, when the UE 400 moves in the wireless communication system including the 4G network and the 5G network.

Figure 5:
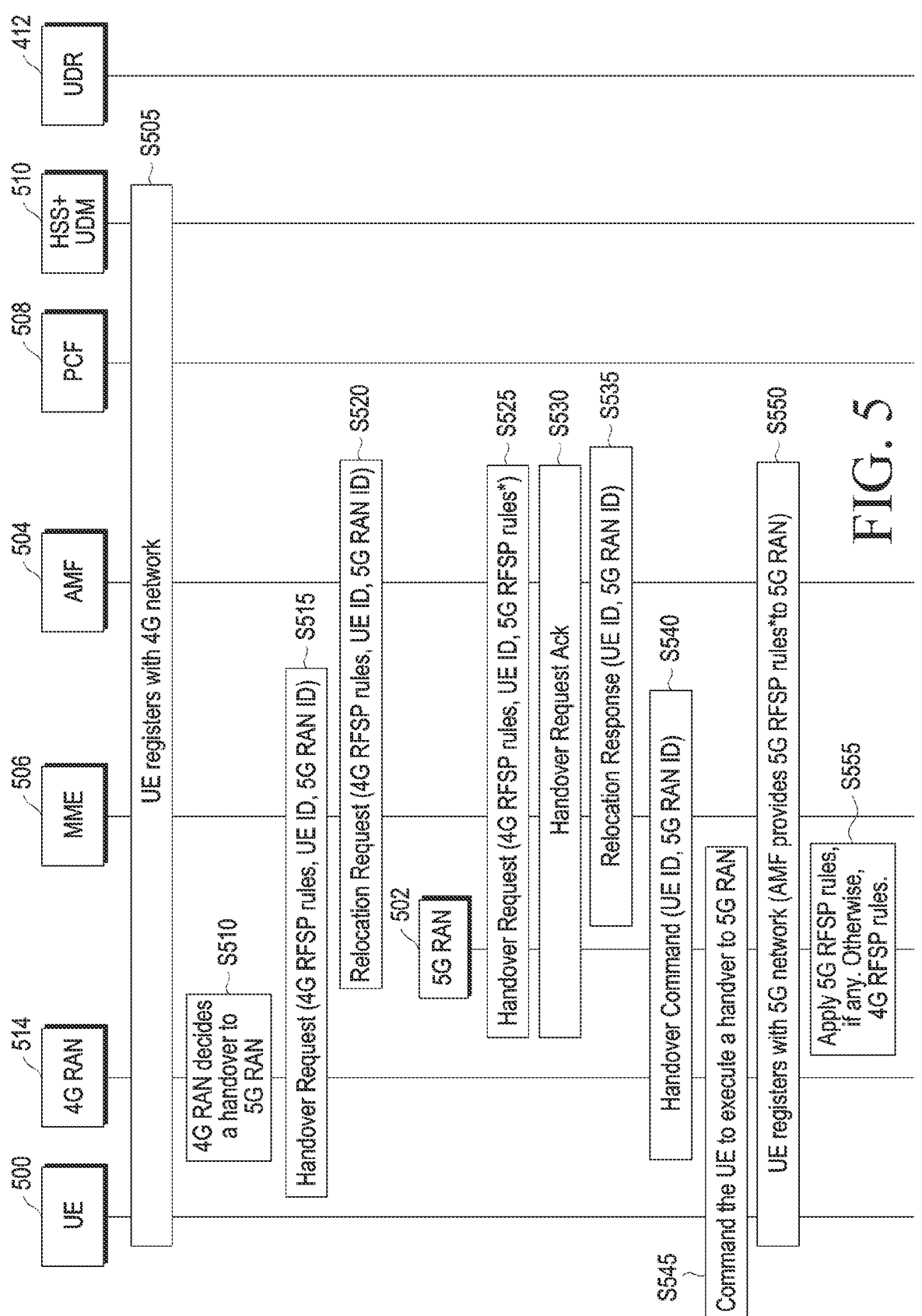
FIG. 5 illustrates a signal flow for a handover procedure for providing an AM policy to a UE when the UE switches from a 4G network to a 5G network according to various embodiments of the present disclosure.

FIG. 5 illustrates a signal flow for a handover procedure for providing an AM policy to a UE when the UE switches from a 4G network to a 5G network according to various embodiments of the present disclosure.

Referring to FIG. 5, a PCF 508 according to an embodiment of the disclosure may provide an AMF 504 with an AM policy to be applied to a UE, and the AMF 504 may transmit an RFSP rule to a RAN 502 so that the RFSP rule is used. Further, the AMF 504 may transmit the RFSP rule to a RAN of a new network to which the UE has moved by a handover signal message, thereby controlling the UE to consistently use a network and a frequency band for communication during movement to the 5G network or the 4G network.

A UE 500 may perform a registration procedure with the 4G network (S505). The registration procedure may include the process of operation S315 described above in the embodiment of FIG. 3, which is equally applied in this embodiment, and thus is not described redundantly in detail.

A 4G RAN 514 may determine handover to the 5G network in consideration of the radio quality of the UE 500 (S510).

The 4G RAN 514 may transmit a handover request message requesting handover to the 5G RAN 502 to an MME 506 (S515). The handover request message may include at least one of information related to a 4G RFSP rule applied to the UE 500 by the 4G RAN 514, UE identification information (a UE ID), and 5G RAN identification information (a 5G RAN ID).

The MME 506 may transmit a relocation request message to the AMF 504 of the 5G network to forward the handover request received from the 4G RAN 514 (S520). The relocation request message may include at least one of the information related to the 4G RFSP rule, the UE identification information, or the 5G RAN identification information included in the handover request message by the 4G RAN 514 in operation S515. According to another embodiment, the MME 506 may directly include the information related to the 4G RFSP rule in the relocation request message without receiving the information related to the 4G RFSP rule from the 4G RAN 514 in operation S520, rather than the 4G RAN 514 includes the information related to the 4G RFSP rule in the handover request message in operation S515.

The AMF 504 may transmit handover request information received from the MME 506 to the 5G RAN 502 through another handover request message (S525). The other handover request message may include the information related to the 4G RFSP rule transmitted by the 4G RAN 514 in operation S515 (or the information related to the 4G RFSP rule included by the MME 506 in operation S520). In addition, the other handover request message may include information related to a 5G default RFSP rule to be applied to the 5G network, preconfigured for a UDR 512 by an operator and transmitted to an HSS+UDM 510 and the AMF 504, or information related to a 5G RFSP rule generated by reflecting a network congestion state, an operator policy, and so on based on the 5G default RFSP rule by the PCF 508. The UDR 512 may transmit the information related to the 5G default RFSP rule to the AMF in the manner illustrated in FIG. 2 or FIG. 3. According to another embodiment, the AMF 504 may determine a new RFSP rule by combining the RFSP rule used in the 4G network received from the MME 506 and the 5G RFSP rule, and transmit the new RFSP rule.

The 5G RAN 502 may transmit a handover request Ack message to the AMF 504 in response to the handover request (S530).

The AMF 504 may transmit a relocation response message to the MME 506 to notify the MMF 506 that the handover request has been accepted (S535).

Upon receipt of the relocation response message, the MME 506 may transmit, to the 4G RAN 514, a handover command message instructing the handover of the UE 500 requested by the 4G RAN 514 to be performed (S540).

The UE 500 may switch to the 5G network according to a command from the 4G RAN 514 and access the 5G RAN 502 to perform a handover procedure (S545).

The UE 500 may perform a registration procedure with the 5G network through the 5G RAN 502 (S550). When the RFSP rule is updated as in operations S230 and S235 of FIG. 2, the AMF 504 may update information related to a changed RFSP rule and transmit the updated information to the 5G RAN 502.

When the 5G RAN 502 has received both the information related to the 5G RFSP rule and the information related to the 4G RFSP rule in the handover process, the 5G RAN 502 may apply the 5G RFSP rule with priority to control the network/RAT and frequency band use of the UE 500 (S555). For example, when the 5G RAN 502 has received both the 4G RFSP rule and the 5G RFSP rule, the 5G RAN 502 may assign a higher application priority to the 5G RFSP rule. This process may enable application of a consistent AM policy, when the UE 500 moves in the wireless communication system including the 4G network and the 5G network.

Figure 6:
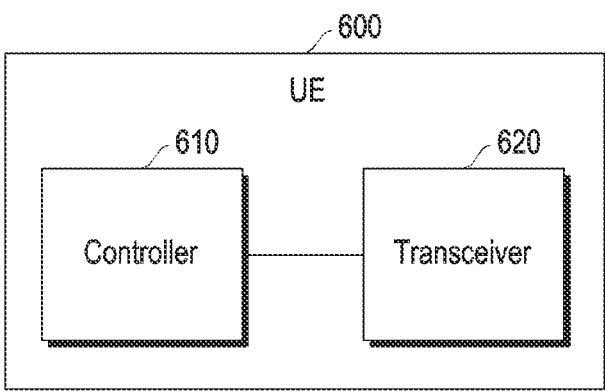
FIG. 6 illustrates an internal structure of a UE according to various embodiments of the present disclosure.

FIG. 6 illustrates a structure of a UE according to various embodiments of the present disclosure. As illustrated in FIG. 6, a UE 600 of the disclosure may include at least one controller (or processor) 610 and a transceiver 620 including a receiver and a transmitter. The UE 600 may include memory (not shown). The transceiver 620 and the memory may be coupled to the at least one controller 610 to operate under the control of the at least one controller 610.

The at least one controller 610 may control to perform the operations of the UE described in FIGS. 2 to 5 of the disclosure. The transceiver 620 may transmit/receive signals to and from a RAN 700, an AMF 800, and an MME 900.

Figure 7:
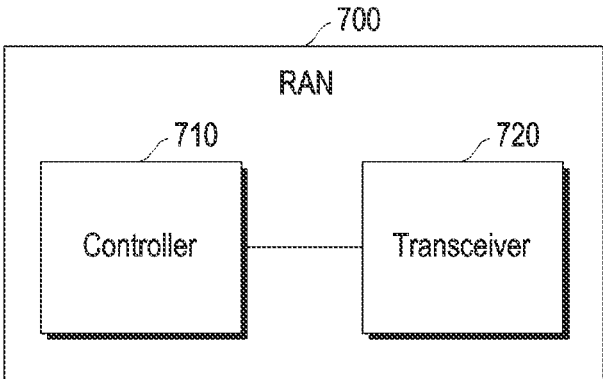
FIG. 7 illustrates an internal structure of a radio access network (RAN) according to various embodiments of the present disclosure.

FIG. 7 illustrates a structure of a RAN according to various embodiments of the present disclosure. As illustrated in FIG. 7, the RAN 700 of the disclosure may include at least one controller (or processor) 710 and a transceiver 720 including a receiver and a transmitter. The RAN 700 may include memory (not shown). The transceiver 720 and the memory may be coupled to the at least one controller 710 to operate under the control of the at least one controller 710.

The at least one controller 710 may control to perform the operations of a RAN described in FIGS. 2 and 3 of the disclosure and the operations of a 4G RAN and a 5G RAN described in FIGS. 4 and 5. The transceiver 720 may transmit and receive signals to and from the UE 600, the AMF 800, and the MME 900.

Figure 8:
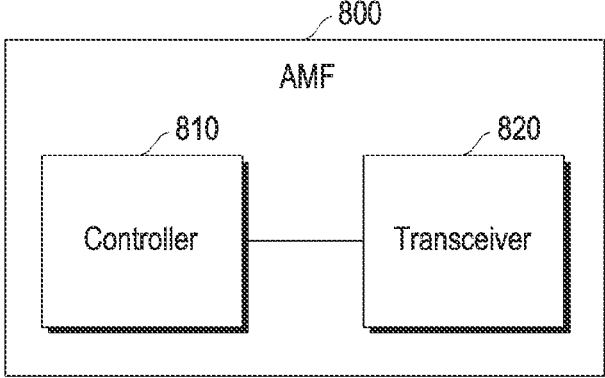
FIG. 8 illustrates an internal structure of an access and mobility management function (AMF) according to various embodiments of the present disclosure.

FIG. 8 illustrates a structure of an AMF according to various embodiments of the present disclosure. As illustrated in FIG. 8, the AMF 800 of the disclosure may include at least one controller (or processor) 810 and a transceiver 820 including a receiver and a transmitter. The AMF 800 may include memory (not shown). The transceiver 820 and the memory may be coupled to the at least one controller 810 to operate under the control of the at least one controller 810.

The at least one controller 810 may control to perform the operations of an AMF described in FIGS. 2 to 5 of the disclosure. The transceiver 820 may transmit and receive signals to and from the UE 600, the RAN 700, the MME 900, a UDM 1000, a PCF, and a UDR.

Figure 9:
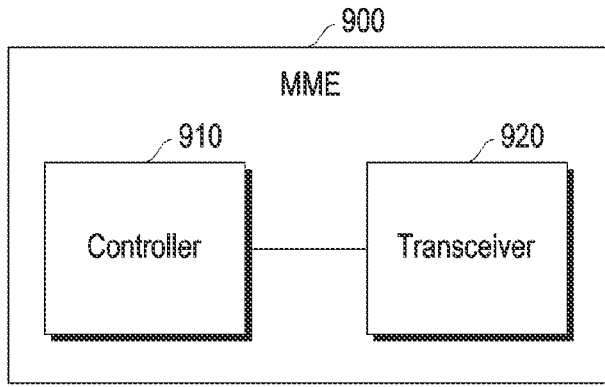
FIG. 9 illustrates an internal structure of a mobility management entity (MME) according to various embodiments of the present disclosure.

FIG. 9 illustrates a structure of an MME according to various embodiments of the present disclosure. As illustrated in FIG. 9, the MME 900 of the disclosure may include at least one controller (or processor) 910 and a transceiver

920 including a receiver and a transmitter. The MME 900 may include memory (not shown). The transceiver 920 and the memory may be coupled to the at least one controller 910 to operate under the control of the at least one controller 910.

The at least one controller 910 may control to perform the operations of an MME described in FIGS. 2 to 5 of the disclosure. The transceiver 920 may transmit and receive signals to and from the UE 600, the RAN 700, the AMF 800, the UDM 1000, the PCF, and the UDR.

Figure 10:
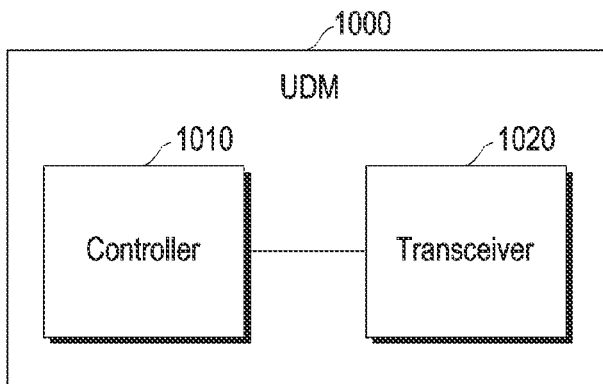
FIG. 10 illustrates an internal structure of a user data management (UDM) according to various embodiments of the present disclosure.

FIG. 10 illustrates a structure of a UDM according to various embodiments of the present disclosure. As illustrated in FIG. 10, the UDM 1000 of the disclosure may include at least one controller (or processor) 1010 and a transceiver 1020 including a receiver and a transmitter. The UDM 1000 may include memory (not shown). The transceiver 1020 and the memory may be coupled to the at least one controller 1010 to operate under the control of the at least one controller 1010. The UDM of FIG. 10 may be configured as a combo node together with an HSS in a system providing interworking. In this case, the UDM may be expressed as HSS+UDM, and HSS+UDM may perform the operations of both the UDM and the HSS and communicate with both the AMF and the MME.

The at least one controller 1010 may control to perform the operations of a UDM described in FIGS. 2 to 5. The transceiver 1020 may transmit and receive signals to and from the UE 600, the RAN 700, the AMF 800, the MME 900, the PCF, and the UDR.

The structures of the devices illustrated in FIGS. 6 to 10 are not limited to the above-described ones, and components may be added according to design. In addition, the devices illustrated in FIGS. 7 to 10 may be configured to be included together in one device as a network, or configured as separate entities.

Although the present disclosure has been described with various embodiments, various changes and modifications may be suggested to one skilled in the art. It is intended that the present disclosure encompass such changes and modifications as fall within the scope of the appended claims.

What is claimed is:

1. A base station (BS) in a wireless communication system, the BS comprising:
   a transceiver; and
   at least one controller coupled to the transceiver, the at least one controller configured to:
      determine whether to perform a handover procedure for a user equipment (UE) based on a communication state of the UE,
      transmit, to an access and management function (AMF), a handover request message for performing the handover procedure for the UE, wherein the handover request message includes information about a priority to select a radio access technology (RAT) and a frequency including a first list of RATs and a second list of frequencies, to be used by the UE, that are ordered based on priorities,
      receive, from the AMF, a handover command for performing the handover procedure for the UE in response to transmitting the handover request message, and
      perform the handover procedure for the UE,
   wherein the handover command comprises multiple pieces of information related to a rule and information indicating that a higher priority is assigned to information related to a 5th generation (5G) network than other information among the multiple pieces of information related to the rule.

2. The BS of claim 1, wherein the handover request message further includes at least one of identification information of the UE or identification information of at least one BS involved in the handover procedure for the UE.

3. A base station (BS) in a wireless communication system, the BS comprising:

a transceiver; and at least one controller coupled to the transceiver, the at least one controller configured to:

receive, from a mobility management entity (MME), a handover request message for performing a handover procedure for a user equipment (UE), wherein the handover request message includes information about a priority to select a radio access technology (RAT) and a frequency including a first list of RATs and a second list of frequencies, to be used by the UE, that are ordered based on priorities;

transmit, to the MME, a handover response message in response to receiving the handover request message for performing the handover procedure for the UE;

perform the handover procedure for the UE; and assign a higher priority to information related to a 5th generation (5G) network than other information among multiple pieces of information related to a rule in case that there are the multiple pieces of information related to the rule.

4. The BS of claim 3, wherein the handover request message further includes identification information of the UE.

5. A method performed by a base station (BS) in a wireless communication system, the method comprising:

determining whether to perform a handover procedure for a user equipment (UE) based on a communication state of the UE;

transmitting, an access and management function (AMF), a handover request message for performing the handover procedure for the UE, wherein the handover request message includes information about a priority to select a radio access technology (RAT) and a frequency including a first list of RATs and a second list of frequencies, to be used by the UE, that are ordered based on priorities;

receiving, from the AMF, a handover command for performing the handover procedure for the UE in response to transmitting the handover request message; and performing the handover procedure for the UE, wherein the handover command comprises multiple pieces of information related to a rule and information indicating that a higher priority is assigned to information related to a 5th generation (5G) network than other information among the multiple pieces of information related to the rule.

6. The method of claim 5, wherein the handover request message further includes at least one of identification information of the UE or identification information of at least one BS involved in the handover procedure for the UE.

7. A method performed by a base station (BS) in a wireless communication system, the method comprising:

receiving, from a mobility management entity (MME), a handover request message for performing a handover procedure for a user equipment (UE), wherein the handover request message includes information about a priority to select a radio access technology (RAT) and a frequency including a first list of RATs and a second list of frequencies, to be used by the UE, that are ordered based on priorities;

transmitting, to the MME, a handover response message in response to receiving the handover request message for performing the handover procedure for the UE;

performing the handover procedure for the UE; and assigning a higher priority to information related to a 5th generation (5G) network than other information among multiple pieces of information related to a rule in case that there are the multiple pieces of information related to the rule, wherein the handover request message includes information related to a rule for selecting a network and a frequency for the UE.

8. The method of claim 7, wherein the handover request message further includes identification information of the UE.

\* \* \* \* \*